(12) United States Patent
Nagaya et al.

(10) Patent No.: US 7,384,218 B2
(45) Date of Patent: Jun. 10, 2008

(54) CLAMPING MECHANISM FOR CUTTING INSERT

(75) Inventors: Hidehiko Nagaya, Ibaraki-ken (JP); Norio Aso, Ibaraki-ken (JP); Yasuharu Imai, Ibaraki-ken (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 11/303,748

(22) Filed: Dec. 15, 2005

(65) Prior Publication Data

US 2006/0147281 A1 Jul. 6, 2006

(30) Foreign Application Priority Data

Dec. 16, 2004 (JP) ............... 2004-364617

(51) Int. Cl.
*B23B 27/04* (2006.01)
(52) U.S. Cl. ..................... 407/110; 407/113
(58) Field of Classification Search ............... 407/116, 407/117, 48, 109, 102, 110, 113, 114, 115
See application file for complete search history.

(56) References Cited

U.S. PATENT DOCUMENTS

| | | | | |
|---|---|---|---|---|
| 5,062,750 A | * | 11/1991 | Oosterhof | 409/132 |
| 5,076,738 A | * | 12/1991 | Pano et al. | 407/110 |
| 5,085,541 A | * | 2/1992 | Simpson, III | 407/110 |
| 5,411,354 A | * | 5/1995 | Gustafsson | 407/110 |
| 5,676,495 A | * | 10/1997 | Katbi et al. | 407/114 |
| 5,921,724 A | * | 7/1999 | Erickson et al. | 407/117 |
| 6,139,227 A | * | 10/2000 | Schafer et al. | 407/110 |
| 6,238,147 B1 | * | 5/2001 | Tagtstrom et al. | 407/117 |
| 6,244,790 B1 | * | 6/2001 | Kingdom et al. | 407/110 |
| 6,428,247 B1 | * | 8/2002 | Friedman | 407/110 |
| 6,565,292 B2 | * | 5/2003 | Hecht | 407/110 |
| 6,579,044 B1 | * | 6/2003 | Trenkwalder et al. | 407/110 |
| 6,758,637 B2 | * | 7/2004 | Gati | 407/92 |
| 6,921,234 B2 | * | 7/2005 | Arvidsson et al. | 407/103 |

FOREIGN PATENT DOCUMENTS

| | | |
|---|---|---|
| AT | 006 939 U1 | 6/2004 |
| EP | 0291933 | 11/1988 |
| JP | 61-037399 | 2/1986 |
| JP | 03-277701 | 12/1991 |
| JP | 10-140210 | 5/1998 |
| JP | 2001-517556 | 10/2001 |
| JP | 2002-003906 | 1/2002 |
| WO | WO99/15297 | 4/1999 |

* cited by examiner

*Primary Examiner*—Willmon Fridie, Jr.
(74) *Attorney, Agent, or Firm*—Darby & Darby

(57) ABSTRACT

A clamping mechanism for a cutting insert that clamps the cutting insert in an insert mounting seat having a pair of contacting surfaces facing each other. Contacting surfaces of the insert mounting seat are provided with a pair of inclined planes inclined so as to be formed in a convex V-shape in the cross-section along the contacting direction, and the contact surfaces of the cutting insert are formed in a concave V-shape which has a pair of convex surfaces with roundness to be concave toward the inclined planes, and the pair of inclined planes and the pair of convex surfaces come in contact with each other at a pair of contacting positions, which have an interval therebetween in the width direction orthogonal to the contacting direction.

30 Claims, 9 Drawing Sheets

US 7,384,218 B2

CLAMPING MECHANISM FOR CUTTING INSERT

INCORPORATION BY REFERENCE

The present application claims priority under 35 U.S.C. §119 to Japanese Patent Application No. 2004-364617 filed on Dec. 16, 2004. The content of the application is incorporated herein by reference in its entirety.

BACKGROUND OF THE INVENTION

1. Field of the Invention

The present invention relates to a clamping mechanism for a cutting insert for clamping the cutting insert in an insert mounting seat of a holder to detachably mount the cutting insert, in an insert detachable tool used for, for example, grooving or cutting-off of work material.

2. Description of the Related Art

As such a clamping mechanism for a cutting insert used for grooving or cutting-off, the following clamping mechanism is known. In the clamping mechanism, a pair of jaws is formed at a tip of a holder so as to be opened to the tip, and a portion between the jaws is used as an insert mounting seat. A cutting insert is inserted into the insert mounting seat and is sandwiched by both of the jaws, whereby a pair of contacting surfaces of these jaws facing each other comes in contact with a pair of contact surfaces of the cutting insert, respectively, to clamp the cutting insert. Furthermore, for example, the following technology is proposed in PCT Japanese Translation Patent Publication No. 2001-517556. In the technology, the contacting surfaces and the contact surfaces are engaged with each other by male and female means, which are formed in a V-shape to be concave and convex. Each of the male and female means is composed of two flat contacting surfaces extending to have an obtuse angle therebetween. In addition, another technology is proposed in a specification of Austrian Patent Publication No. 006939U1. According to the another technology, in the male and female means formed in a V-shape, two contacting surfaces composing the convex V-shaped male means are formed in a concave shape, and two contacting surfaces composing the concave V-shaped female means are formed in a convex shape having a curvature radius smaller than that of the concave shape so that the contacting surfaces are engaged with the contact surfaces.

However, as described in PCT Japanese Translation Patent Publication No. 2001-517556, in the technology in which the contacting surfaces and the contact surfaces are engaged with each other by male and female means, which are formed in a V-shape to be convex and concave and are composed of two flat contacting surfaces, respectively, the V-shaped angles of both the insert and the insert mounting seat should be formed to be exactly equal to each other. Otherwise, it is not possible to clamp the insert by close contact between the contacting surfaces and the contact surfaces. That is, for example, when the convex V-shaped angle is slightly larger than the concave V-shaped angle, the contacting surfaces just come in line contact with each other at both ends in the width direction of these surfaces orthogonal to the contacting direction. In contrast, when the concave V-shaped angle is slightly larger than the convex V-shaped angle, the contact surfaces come in contact with each other at the inside in the width direction. As a result, the cutting insert is unstably mounted in all of the cases. Furthermore, when there is any error in the angles, contacting positions are varied by the plus and minus of the angles at the outer and inner ends of the contacting surfaces and the contact surfaces in the width direction. Accordingly, for example, when the cutting insert is replaced, if there are plus and minus errors caused by the variation of the shape accuracy between before and after the replacement of the cutting insert, the contacting positions are varied at both ends in the width direction. For this reason, there is a fear that the cutting accuracy will be also varied by the replacement of the cutting insert.

In addition, as disclosed in the specification of Austrian Patent Publication No. 006939U1, in the technology in which the contacting surfaces and the contact surfaces formed in a V-shaped to be convex and concave are formed by two contacting surfaces forming the convex shape and two contacting surfaces forming the concave shape, respectively, after the concave and convex V-shaped angles formed by the contacting surfaces and the contact surfaces are set as to predetermined angles, a total of four concave and convex surfaces are more difficult to be formed so as to have high accurate predetermined curvature radius. Accordingly, when there are errors in the V-shaped angles, there is a fear that the contacting positions between the contacting surfaces and the contact surfaces will be shifted in the width direction. Meanwhile, if the curvature radius of the convex surface is larger than that of the concave surface due to, for example, shape errors, there is a possibility that the contacting surfaces and the contact surfaces come in contact with each other at two inside positions and at two outside positions in the width direction, that is, at a total of four positions. Therefore, the contacting surfaces and the contact surfaces actually come in contact with each other at two positions, which make it impossible to stably clamp the insert. In addition, there is a fear that the cutting insert will deviate and move due to the fact that each of convex-shaped contacting surfaces is guided by a concave-shape contacting surface during the clamping and the cutting.

SUMMARY OF THE INVENTION

The invention has been made to solve the above-mentioned problems, and it is an object of an aspect of the invention to provide a clamping mechanism for a cutting insert in which contacting surfaces and contact surfaces are easily formed, and which can stably clamp a cutting insert by the contact between the contacting surfaces and the contact surfaces at predetermined positions in the width direction.

According to the invention, in order to achieve the object by solving the problems a clamping mechanism for a cutting insert clamps the cutting insert by inserting the cutting insert into an insert mounting seat. The insert mounting seat is formed at a tip of a holder having a pair of contacting surfaces facing each other, and the cutting insert has a pair of contact surfaces that come in contact with the pair of contacting surfaces, respectively. In this case, of at least one of the pair of contacting surfaces and at least one of the pair of contact surfaces coming in contact with the contacting surfaces, one has a pair of inclined planes that are formed in a V-shape to be convex, and the other is formed in a V-shape that has a pair of convex surfaces with roundness to be concave toward the inclined planes, in the cross-section along a contacting direction in which the contacting surfaces come in contact with the contact surfaces. Further, the pair of inclined planes and the pair of convex surfaces come in contact with each other at a pair of contacting positions, which have an interval therebetween in the width direction orthogonal to the contacting direction, in the cross-section along the contacting direction.

DESCRIPTION OF THE PREFERRED EMBODIMENTS

Figure 1:
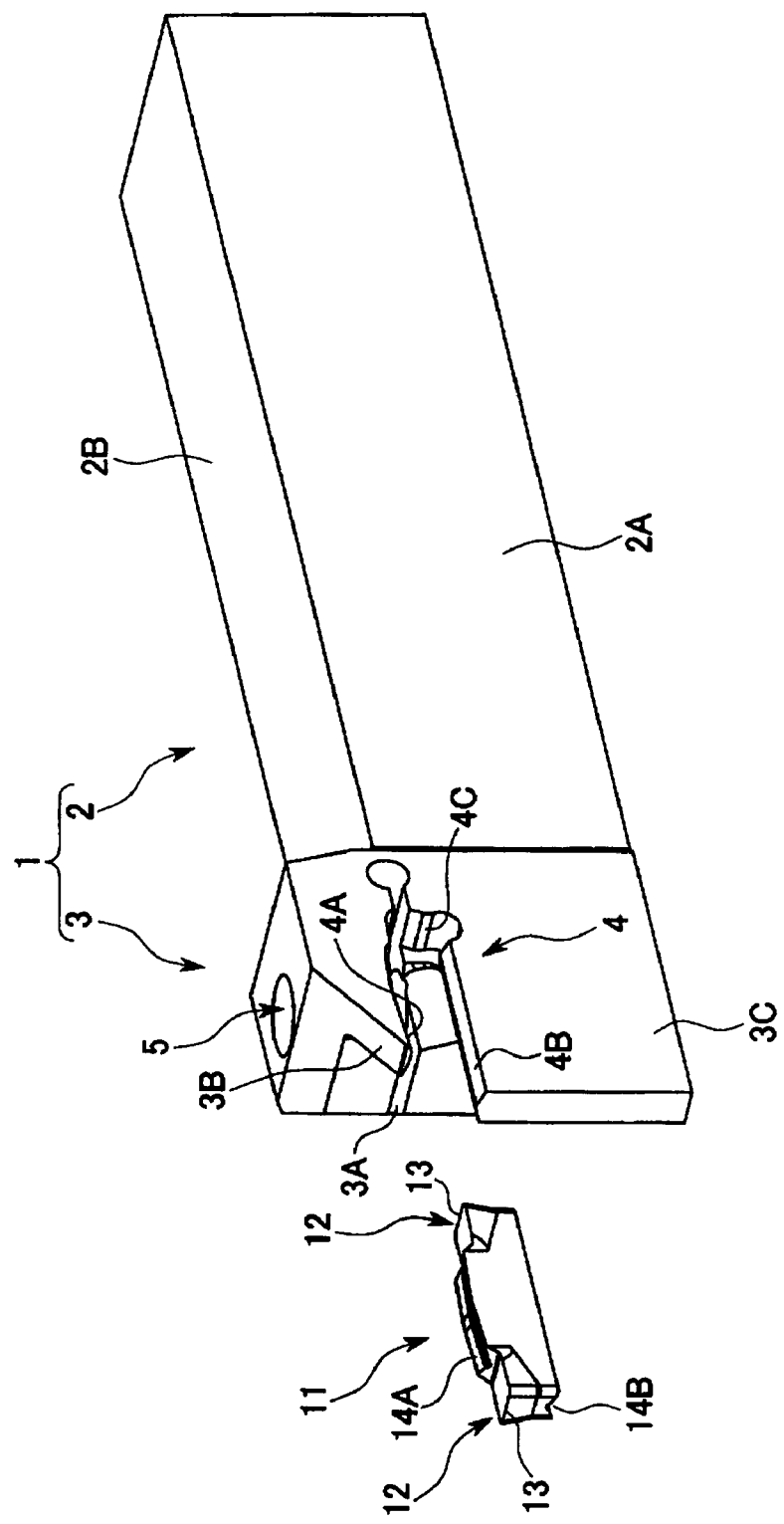
FIG. 1 is an exploded perspective view showing a holder 1 and a cutting insert 11 of an insert detachable tool to which a first embodiment of the invention is applied.
Figure 2:
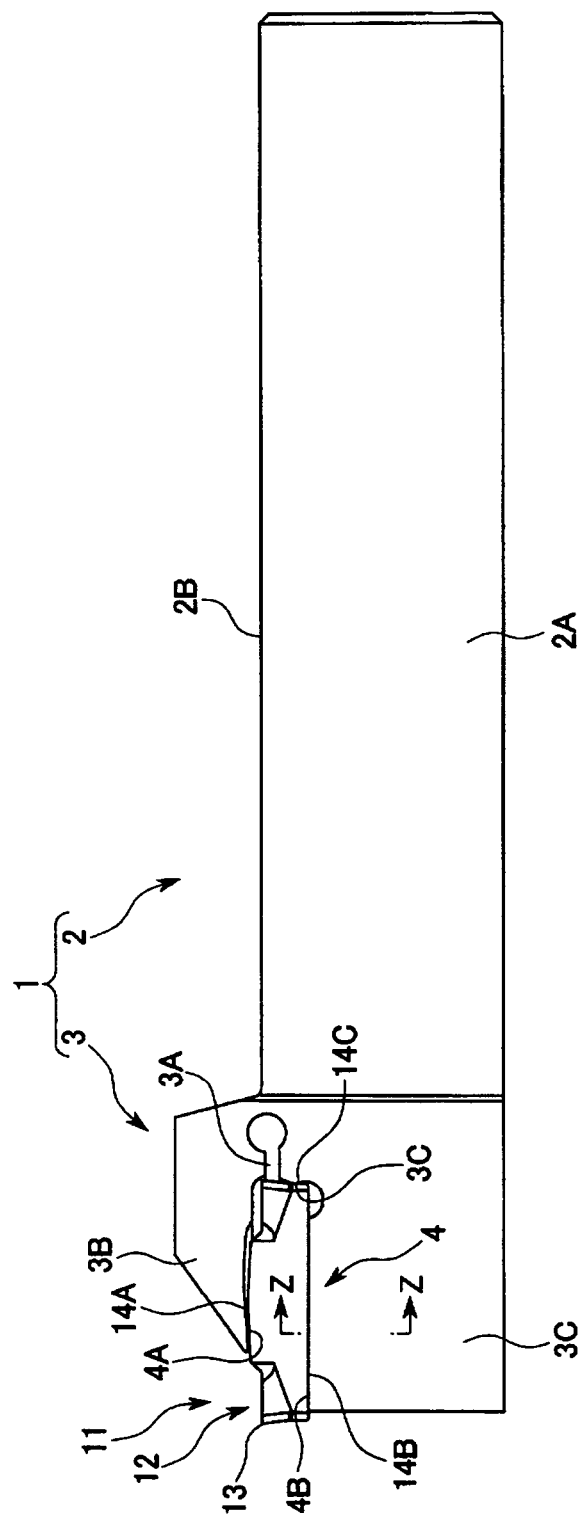
FIG. 2 is a side view of the insert detachable tool shown in FIG. 1.
Figure 3:
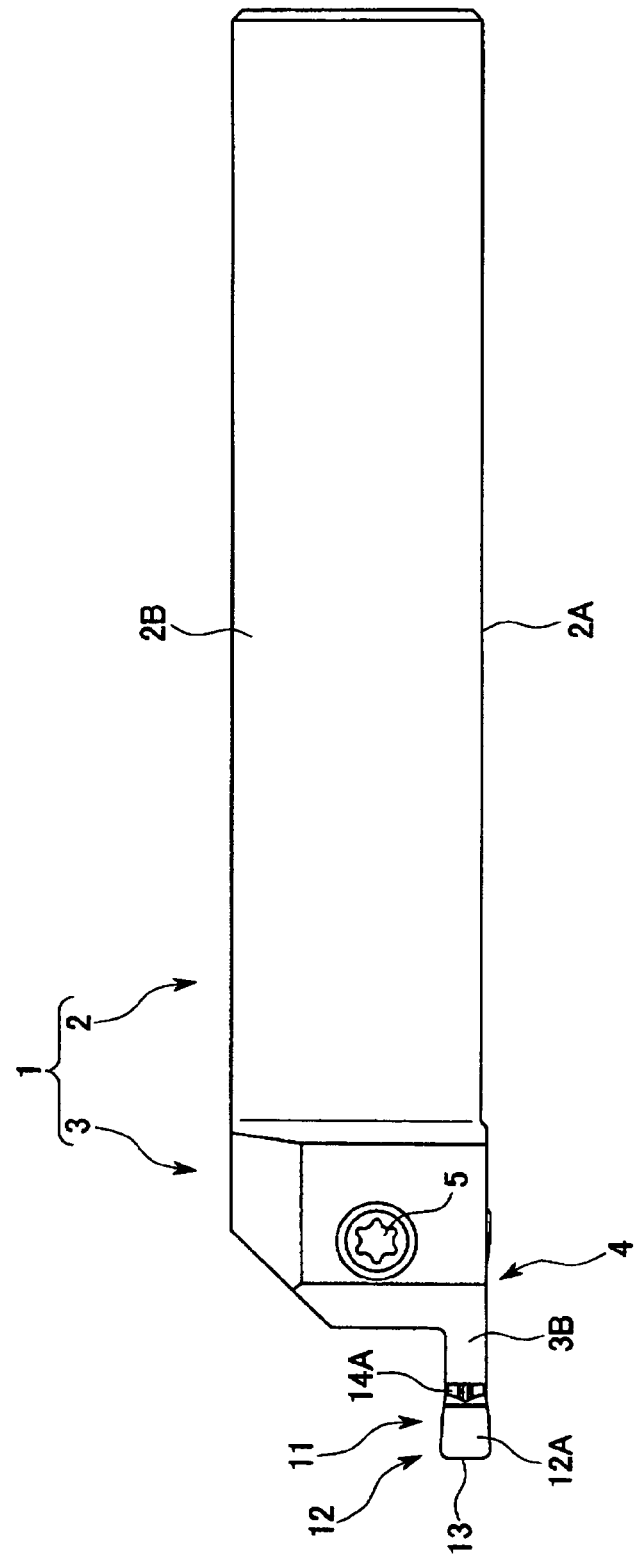
FIG. 3 is a plan view of the insert detachable tool shown in FIG. 1.
Figure 4:
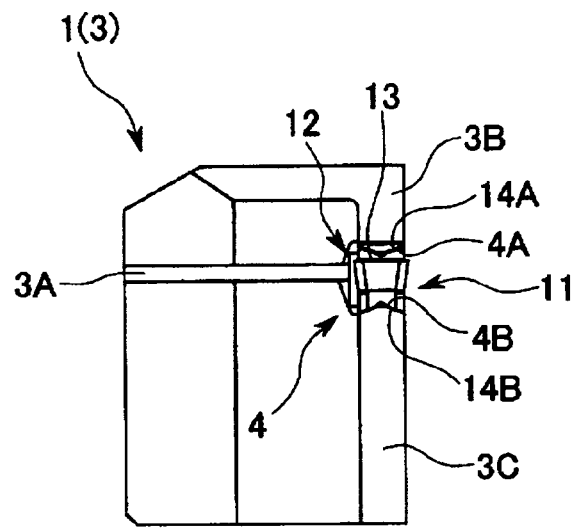
FIG. 4 is a front view of the insert detachable tool shown in FIG. 1.

FIGS. 1 to 5 show an insert detachable tool to which a first embodiment of a clamping mechanism of the invention is applied. In the insert detachable tool, a holder 1 is made of steel, etc., and has a quadrangular prismatic shank 2 at a rear end (on the right side in FIGS. 2 and 3) as shown in FIGS. 1 to 4, and a head 3 at a tip (on the left side in FIGS. 2 and 3). The head 3 protrudes slightly from one side surface 2A of the shank 2 as shown in FIG. 3 in plan view, and protrudes so as to rise from a top surface 2B of the shank 2 as shown in FIG. 2 in side view from the side surface 2A.

The head 3 is provided with a slit 3A along an extension surface of the top surface 2B of the shank 2 from the tip so that an upper jaw 3B above the slit 3A can be elastically deformed. An open groove of the slit 3A at the side surface 2A is provided with an insert mounting seat 4 that is formed in a concave groove shape wider than the slit 3A in an up-and-down direction. This insert mounting seat is formed so as to be opened to the tip of the head 3 and so as to extend toward the rear end, so that a pair of contacting surfaces 4A and 4B is formed at the upper and lower jaws 3B and 3C of the insert mounting seat 4 so as to face each other in the up-and-down direction. Accordingly, in the present embodiment, an up-and-down direction, in which the pair of contacting surfaces 4A and 4B come closer to or separate from each other due to the elastic deformation of the upper jaw 3B, is defined as a contacting direction. Furthermore, these contacting surfaces 4A and 4B are formed so as to be symmetric with respect to a common plane P that extends in the contacting direction through a central portion of each of the contacting surfaces 4A and 4B in a width direction (a right-and-left direction in FIG. 5), in the cross-section orthogonal to the longitudinal direction.

In addition, a tip of the lower jaw 3C extends in the shape of a rectangular flat plate toward the tip along the side surface 2A of the shank 2, so that the contacting surface 4B at the lower jaw 3C is formed so as to extend to about the middle of the slit 3A in a longitudinal direction of the holder 1 from the tip of the lower jaw 3C. On the other hand, a tip of the upper jaw 3B at the side surface 2A is formed in the shape of a triangular plate having an oblique side that approaches the lower side as it goes toward the tip so as to extend along the rectangular flat plate formed by the lower jaw 3C. It is noted here that this tip is caused to retreat from the tip of the lower jaw 3C, and the contacting surface 4A at the upper jaw 3B is provided so as to extend from a position closer to the tip side than a longitudinal central portion of the contacting surface 4B of the lower jaw 3C to a position slightly closer to the tip side than a rear end of the contacting surface 4B.

In addition, at a rear end of the insert mounting seat 4, a third contacting surface 4C facing the tip side is formed in the lower jaw 3C, so that the slit 3A is provided so as to extend to a position immediately before the rear end of the head 3 beyond the third contacting surface 4C. Furthermore, a clamping screw 5 is inserted so as to pass through the slit 3A in the up-and-down direction on the back side of the insert mounting seat 4 of the head 3 toward the opposite side to the side surface 2A. In this case, a threaded portion of the clamping screw is threadedly attached to one of the upper and lower jaws 3B and 3C, and a head of the clamping screw 5 comes in contact with the other of the upper and lower jaws 3B and 3C. Accordingly, the upper jaw 3B is elastically deformed to approach the lower jaw 3C by screwing the clamping screw 5, so that the cutting insert 11 inserted into the insert mounting seat 4 is sandwiched and clamped in the contacting direction.

Figure 6:
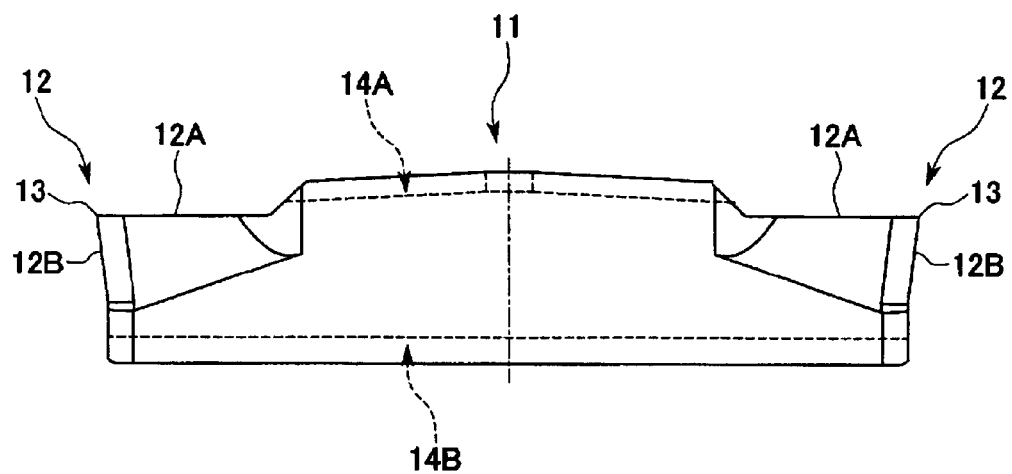
FIG. 6 is a plan view of a cutting insert 11 to be clamped in the first embodiment of the invention.
Figure 7:
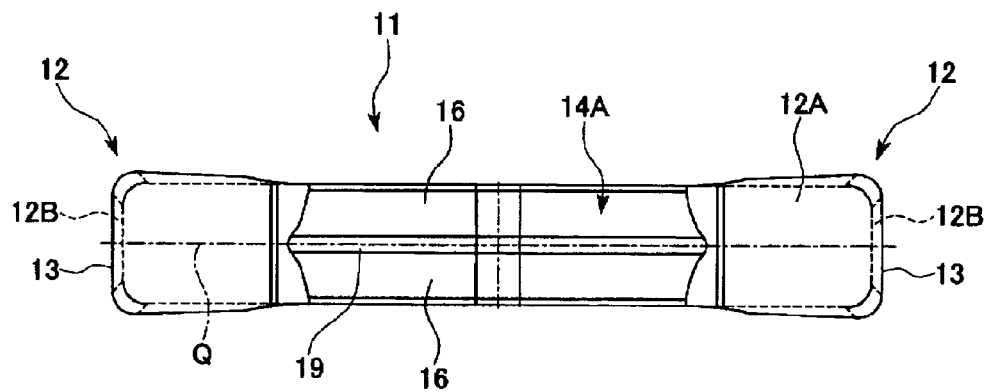
FIG. 7 is a side view of the cutting insert 11 shown in FIG. 6.
Figure 8:
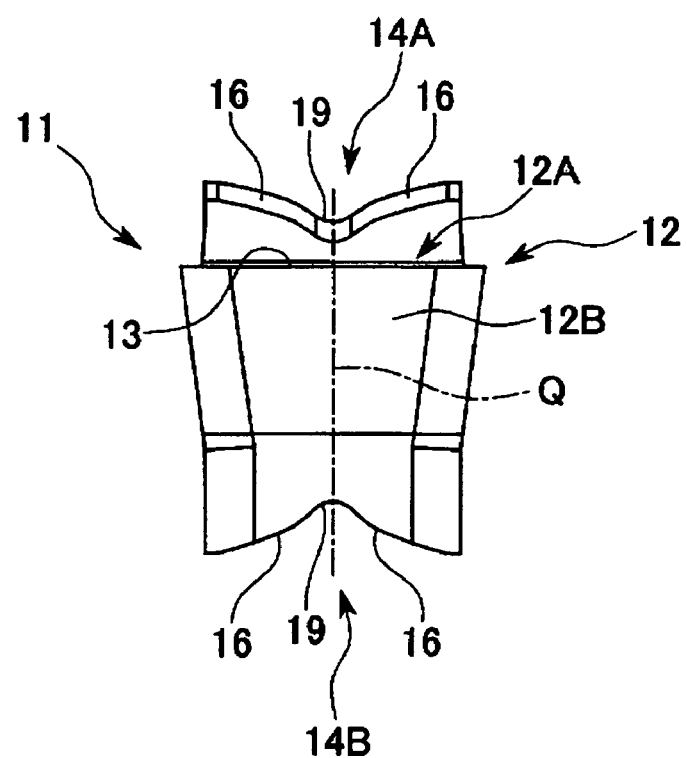
FIG. 8 is a front view of the cutting insert 11 shown in FIG. 6.

As shown in FIGS. 6 to 8, the cutting insert 11 is a so-called dog bone type of cutting insert that is formed in a substantially quadrangular prismatic shape made of hard material, such as cemented carbides, and has cutting edge portions 12 at both longitudinal ends thereof. Specifically, in these cutting edge portions 12, their top surfaces are used as rake faces 12A that are gradually widened toward both ends thereof, respectively, and have a substantially isosceles trapezoidal shape in plan view, tip faces of the cutting edge portions 12 are used as flank faces 12B, and cutting edges 13 are formed in intersecting ridgelines of the rake faces 12A and the flank faces 12B, that is, in side ridges of the rake faces 12A at both ends of the insert.

Moreover, a portion between the cutting edge portions 12 at both ends of the top surface of the cutting insert 11 and a bottom surface of the cutting insert are provided with a pair of contact surfaces 14A and 14B to come in contact with the pair of contacting surfaces 4A and 4B of the insert mounting seat 4, respectively. Accordingly, an up-and-down direction on the cutting insert 11 is also the contacting direction. In addition, the cutting insert 11 of the present embodiment is symmetric with respect to a plane orthogonal to the longitudinal direction in its longitudinal central portion, and a plane Q that is orthogonal to this plane and extends in the contacting direction through the widthwise (a up-and-down direction in FIG. 7, a right-and-left direction in FIG. 8) central portions of the contact surfaces 14A and 14B.

Further, the lower contact surface 14B is formed so as to extend along the longitudinal direction of the cutting insert 11 and has a constant cross-section over the entire length thereof. Meanwhile, the upper contact surface 14A is formed so as to gradually protrude from both of the longitudinal ends thereof toward the central portion thereof in a very small angle of inclination so that each of the cross-sections of the upper contact surface along the protruding direction thereof has a constant cross-section and the upper contact surface 14A extends parallel to the lower contact surface in an extremely short range of its longitudinal central portion. Moreover, below the flank faces 12B of the cutting edge portions 12 on both end faces of the cutting insert 11, third contact surfaces 14C are formed so as to be perpendicular to the longitudinal direction of the cutting inset 11. One of the third contact surfaces 14C comes in contact with the third contacting surface 4C when the cutting insert 11 is inserted into the insert mounting seat 4 from its tip side.

Of at least one of the pair of contacting surfaces 4A and 4B, and at least one of the pair of contact surfaces 14A and 14B coming in contact with the contacting surfaces 4A and 4B, one has a pair of inclined planes 15 and 15 that are formed in a V-shape to be convex, and the other is formed in a V-shape that has a pair of convex surfaces 16 and 16 with roundness to be convex toward the inclined planes 15 and 15, in the cross-section along the contacting direction. In the present embodiment, both of the pair of contacting surfaces 4A and 4B of the insert mounting seat 4 are formed in a V-shape to be convex by the pair of inclined planes 15 and 15 in the cross-section orthogonal to the longitudinal direction of the holder 1 along the contacting direction. In addition, the pair of contact surfaces 14A and 14B of the cutting insert 11 are formed in a V-shape to be concave by the pair of convex surfaces 16 and 16 in the cross-section orthogonal to the longitudinal direction of the cutting insert 11 along the contacting direction. Accordingly, in the cross-sections, the contacting surfaces 4A and 4B, and the contact surfaces 14A and 14B are formed in a V-shape so as to be substantially concave and convex, and so as to have planes P and Q as bisectors, respectively.

Here, the pair of inclined planes 15 and 15 forming the contacting surfaces 4A and 4B is inclined so as to be intersected with each other in an obtuse angle, and the intersection angle α is in the frange of 110° to 160° in the present embodiment. In the cross-section, a V-shaped projection, in which the inclined planes 15 and 15 are intersected with each other, is chamfered so as to have a flat plane 17 intersecting the inclined planes 15 and 15 in the same angle. Accordingly, the flat plane 17 is perpendicular to the plane P in the cross-section.

In addition, as the upper contact surface 14A of the cutting insert 11 comes in contact with the contacting surface 4A formed on the upper jaw 3B of the head 3 gradually protrudes from both of the longitudinal ends thereof toward the central portion thereof as described above, the tip of the contacting surface 4A is formed so as to be inclined upward toward the rear end thereof in the substantially same angle as that of the upper contacted surface. Accordingly, when the clamping screw 5 is screwed, only the tip of the contacting surface 4A comes in contact with a portion of the contact surface 14A extending from the central portion thereof to the tip thereof. The tip of the contacting surface 4A coming in contact with the contact surface 14A is positioned on the middle of the contacting surface 4B of the lower jaw 3C in the longitudinal direction thereof, or is positioned closer to the tip than the position described above.

Meanwhile, the cross-sections of the pair of convex surfaces 16 and 16, which is formed on the contact surfaces 14A and 14B of the cutting insert 11, are formed in the shape of a circular arc so that the contact surfaces 14A and 14B are formed in a V-shape to be gradually recessed toward the inner portion thereof in the width direction as a whole. Furthermore, V-shaped recesses, in which the pair of convex surfaces 16 and 16 is intersected, formed by the contact surfaces 14A and 14B is composed of concave surfaces 19 formed in the shape of a circular arc.

Figure 5:
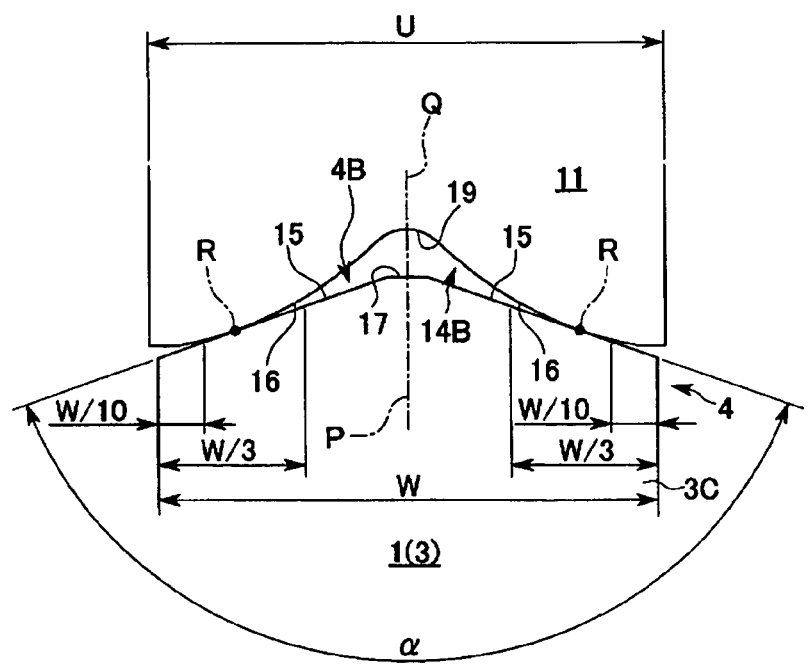
FIG. 5 is a cross-sectional view along a contacting direction (cross-sectional view taken along line ZZ of FIG. 2), which shows a state in which a lower contacting surface 4B of an insert mounting seat 4 and a lower contact surface 14B come in contact with each other.

In addition, a radius of the circular arc, which is formed in the cross-section of the convex surface 16, is in the range of 0.4 times to 4.0 times of the width dimension which is not the smaller one between dimensions of the contacting surfaces 4A and 4B, and the contact surfaces 14A and 14B coming in contact with each other. Specifically, in the present embodiment, as shown in FIG. 5, in all of the contacting surfaces 4A and 4B, and the contact surfaces 14A and 14B, the width dimensions U of the contact surfaces 14A and 14B of the cutting insert 11 are larger than the width dimensions W of the contacting surfaces 4A and 4B of the insert mounting seat 4. Therefore, the curvature radius of a first convex surface portion 16A is in the range of 0.4 times to 4.0 times of the width dimensions U of the contact surfaces 14A and 14B of the cutting insert 11.

Furthermore, an intersection angle between a tangent line touching the convex surface 16 and the plane Q at a contact point at any position on the convex surface 16 in the cross-section is equal to an intersection angle between the inclined plane 15 of the contacting surfaces 4A and 4B and the plane P in the cross-section. Accordingly, when the contacting surfaces 4A and 4B and the contact surfaces 14A and 14B come in contact with each other so as to align the planes P and Q with each other, the pair of inclined planes 15 and 15, and the pair of convex surfaces 16 and 16 come in contact with each other at a pair of contacting positions R and R which have an interval therebetween in the width direction.

Here, a pair of contacting positions R and R is positioned in the range of one-tenth to one-third of the width dimension which is not the larger one between dimensions, from both of the longitudinal ends thereof toward the inner portion thereof, of the contacting surfaces 4A and 4B and the contact surfaces 14A and 14B, in which the pair of inclined planes 15 and 15 and the pair of convex surfaces 16 and 16 come in contact with each other at a pair of contacting positions R and R in the cross-section. Specifically, in the present embodiment, as described above, of the contacting surfaces 4A and 4B, and the contact surfaces 14A and 14B, the width dimensions U of the contact surfaces 14A and 14B are larger than the width dimensions W of the contacting surfaces 4A and 4B of the insert mounting seat 4, that is, the width dimensions W of the contacting surfaces 4A and 4B are smaller than the width dimensions U of the contact surfaces 14A and 14B. Accordingly, both of the contacting positions R and R are positioned in the range of one-tenth to one-third of the width dimensions W of the contacting surfaces 4A and 4B from both of the widthwise ends thereof toward the inner portion thereof. The contacting positions R and R are positioned to be symmetric with respect to the planes P and Q.

When the cutting insert 11 is clamped by the clamping mechanism having the above configuration, first, the contact surface 14B comes in contact with the contacting surface 4B of the lower jaw 3C further protruding than the upper jaw 3B of the holder 1 to mount the cutting insert 11 in a state in which the clamping screw 5 is loosened, and then the cutting insert 11 is inserted into the insert mounting seat toward the rear end of the holder 1. In the present embodiment as described above, the contacting surface 4B and the contact surface 14B come in contact with each other at the contacting positions R and R, which have an interval between the inclined planes 15 and 15, and the first convex surface portions 16A and 16A of the convex surfaces 16 and 16 in the width direction, and the planes P and Q are aligned with each other in this state. For this reason, the cutting insert 11 is inserted into the insert mounting seat 4 in a state in which the plane Q, which is a center of symmetry of the cutting insert, is aligned with the plane P, which is a center of symmetry of the insert mounting seat 4, and then is positioned in the longitudinal direction thereof due to the fact that the third contact surface 14C comes in contact with the third contacting surface 4C.

Further, as the clamping screw 5 is screwed from this state, the upper jaw 3B of the head 3 is elastically deformed so that the contacting surface 4A approaches the tip of the upper contact surface 14A in the contacting direction. Accordingly, the inclined planes 15 and 15 of the pair of contacting surfaces 4A, and the convex surfaces 16 and 16 of the pair of contact surfaces 14A come in contact with each other at the contacting positions R and R so that the cutting insert 11 is clamped between the upper and lower jaws 3B and 3C of the head 3. In this case, the tip of the upper contact surface 14A of the cutting insert 11 coming in contact with the contacting surface 4A is inclined so as to be recessed toward the tip, and the contacting surface 4A of the upper jaw 3B is inclined as described above in a state in which the contacting surface 4A comes in contact with the contact surface 14A. Therefore, the cutting insert 11 is inserted into the insert mounting seat toward the rear end of the holder so that the third contact surface 14C is pressed against the third contacting surface 4C that is formed at the rear end of the insert mounting seat 4, and the cutting insert is retained so as not to be fallen out toward the tip.

In the clamping mechanism for a cutting insert 11 having the above configuration, first, since the contacting surfaces 4A and 4B, which are formed in a V-shape so as to be convex in the cross-section, are composed of a pair of inclined planes 15 and 15, it is possible to form the contacting surfaces with ease and high accuracy. Accordingly, it is possible to form the inclined planes 15 and 15 so that the inclined planes 15 and 15 have a predetermined intersection angle and are symmetric with respect to the plane P. The contacting surfaces 4A and 4B come in contact with the contact surfaces 14A and 14B. The contact surfaces 14A and 14B are formed in a V-shape by a pair of convex surfaces 16 and 16 with roundness to be concave toward the inclined planes 15 and 15. The convex surface 16 necessarily comes in contact with the inclined plane 15 at one contacting position R on the convex surface 16. Even if there are some errors in the pair of inclined planes 15 and 15, an intersection angle formed in a V-shape so as to be concave and convex, or a radius of the convex surface 16, the cutting insert barely moves along the convex surface 16 in the width direction. Therefore, the contacting position R can be controlled so as to be positioned in the predetermined range in the width direction.

In addition, the pair of convex surfaces 16 and 16 is formed in a V-shape so as to be concave and comes in contact with the inclined planes 15 and 15 formed in a V-shape so as to be convex. Accordingly, even if an excessive load is applied to the cutting edges 13 during the cutting, the cutting insert 11 does not deviate due to the fact that the convex surface 16 is guided by the inclined plane 15. Therefore, it is possible to more stably hold the cutting insert 11. Furthermore, microscopically, since the convex surface 16 comes in contact with the inclined plane 15 in a state nearer to surface contact in which the range having a width as well as one point of the contacting position R comes in contact with each other, it is possible to secure still higher stability and installation strength. Therefore, according to the clamping mechanism having the above configuration, the cutting insert 11 can be clamped with stability and high accuracy without high shape accuracy of the contacting surfaces 4A and 4B, and the contact surfaces 14A and 14B as described above, whereby it is possible to facilitate grooving or cutting-off with ease and high accuracy.

Moreover, in the present embodiment, both of the pair of contacting surfaces 4A and 4B of the insert mounting seat 4 are formed in a V-shape to be convex by the inclined planes 15 and 15, and both of the pair of contact surfaces 14A and 14B of the cutting insert 11 are formed in a V-shape to be concave by the convex surfaces 16 and 16. However, at least one pair of the contacting surface 4A and the contact surface 14A, and the contacting surface 4B and the contact surface 14B, which come in contact with each other, may be formed in a V-shape to be concave and convex by the inclined plane 15 and the convex surface 16. Furthermore, at least one of the contacting surfaces 4A and 4B may be formed in a V-shape to be concave by the convex surfaces 16 and 16, and at least one of the contact surfaces 14A and 14B coming in contact therewith may be formed in a V-shape to be convex by the inclined planes 15 and 15. However, for example, when both of the contact surfaces 14A and 14B are formed in a V-shape to be convex, a cross-section of the cutting insert 11 becomes a substantial circle. As a result, there is a fear that stability is lost. For this reason, it is preferable that the contact surfaces 14A and 14B of the cutting insert 11 be formed in a V-shape to be concave by the convex surfaces 16 and 16.

In addition, even if one pair of the contacting surfaces 4A and 4B, and the contact surfaces 14A and 14B is formed in a V-shape to be convex by the inclined planes 15 and 15 and the other pair thereof is formed in a V-shape to be concave by the convex surfaces 16 and 16, the intersection angle α between the inclined planes 15 and 15 of the V-shaped projection is small. Further, if the curvature radius of convex surface 16 is large at the contacting position R, the variation of the contacting position R increases at the time when there is a shape error on the convex surface 16. As a result, there is a fear that stability is lost. Meanwhile, if the intersection angle a between the inclined planes 15 and 15 of the V-shaped projection is excessively large so that the contacting surface 4A formed by the inclined planes 15 and 15 becomes substantially flat, when a load is applied to the cutting insert 11 in the width direction, it is not possible to ensure stability. Furthermore, when the curvature radius of convex surface 16 is excessively small, the contacting surface comes in contact with the inclined plane 15 in a state nearer to line contact. Accordingly, there is a fear that an effect by the above-mentioned surface contact is lost.

For this reason, as described in the present embodiment, the pair of inclined planes 15 and 15 is preferably inclined to have an intersection angle α in the range of 110° to 160° even the case of an obtuse angle. In addition, the curvature radius of convex surface 16 is also preferably in the range of 0.4 times to 4.0 times of the width dimension U which is not the smaller one between the width dimensions of the contacting surfaces 4A and 4B, and the contact surfaces 14A and 14B in the cross-section along the contacting direction. Moreover, the convex surface 16 may have the above-mentioned curvature radius at least at the contacting surfaces R and R. Further, non-contacting portions of the convex surface may be formed to have a curvature radius different from the above-mentioned curvature radius, or may be formed in the shape of an inclined surface or concave surface as the case may be, as long as the convex surface does not interfere with the inclined plane 15.

Meanwhile, as described above, in the clamping mechanism having the above configuration, the pair of contacting positions R and R between the contacting surfaces 4A and 4B and the contact surfaces 14A and 14B can be controlled so as to be positioned in the predetermined range in the width direction. On the basis of this, in the present embodiment, the contacting positions R and R are positioned in the range of one-tenth to one-third of the width dimensions W of the contacting surfaces 4A and 4B, from both of the widthwise ends thereof toward the inner portion thereof, which have the smaller one between the width dimensions of the contacting surfaces 4A and 4B and the contact surfaces 14A and 14B. Accordingly, since the contacting surfaces 4A and 4B come in contact with the contact surfaces 14A and 14B at the contacting position R within the range, it is possible to further improve mounting stability of the cutting insert 11 according to the invention. For example, even when a large load is applied to any portion of the cutting edges 13 in the width direction during the cutting, it is possible to reliably prevent the cutting insert 11 being inclined.

That is, when the contacting positions R and R are positioned in the inside of the range, the distance between the pair of contacting positions R and R is too small so that the contacting surfaces 4A and 4B come in contact with the contact surfaces 14A and 14B at the widthwise central portion in a state nearer to one point contact. Accordingly, when a large load is applied to the cutting insert in the width direction during the cutting, there is a fear that the cutting insert is inclined. Meanwhile, when the contacting positions R and R are positioned out of the range, the clamping force caused by the clamping screw 5 is concentrated on each of outer portions, which have small dimensions in the width direction, (the contacting surfaces 4A and 4B in the present embodiment). Accordingly, there is a fear that deficits or transformations occur in each of the outer portions.

Figure 9:
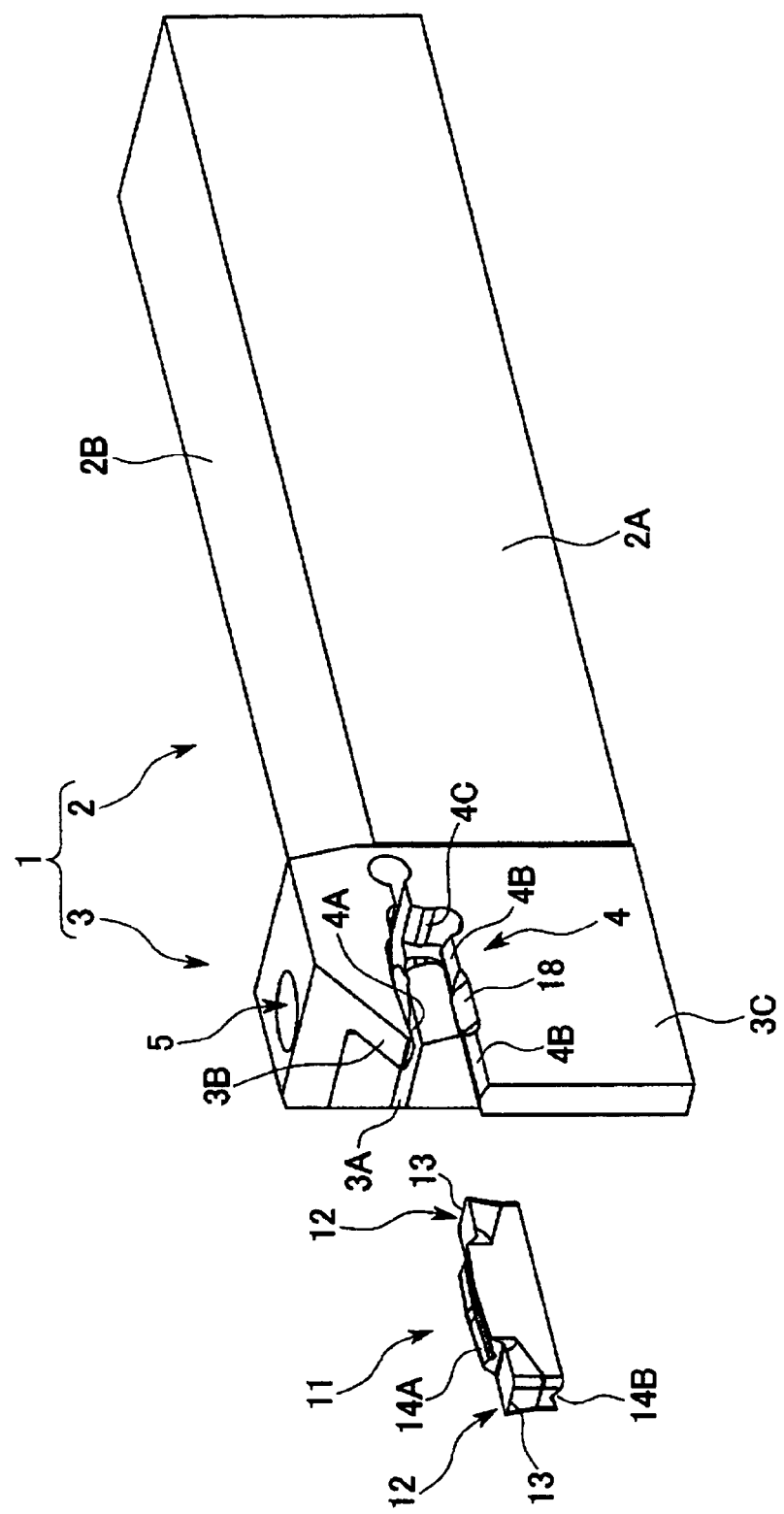
FIG. 9 is an exploded perspective view showing a holder 1 and a cutting insert 11 of an insert detachable tool to which a second embodiment of the invention is applied.
Figure 10:
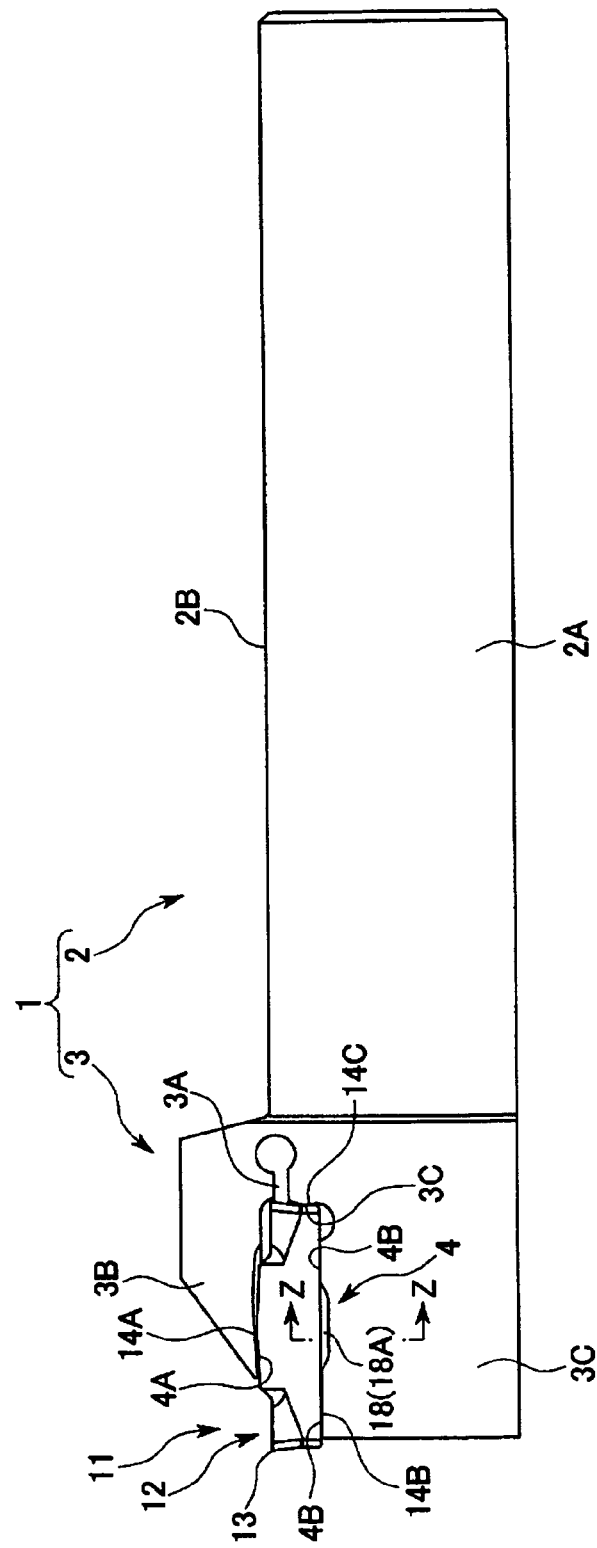
FIG. 10 is a side view of the insert detachable tool shown in FIG. 9.
Figure 11:
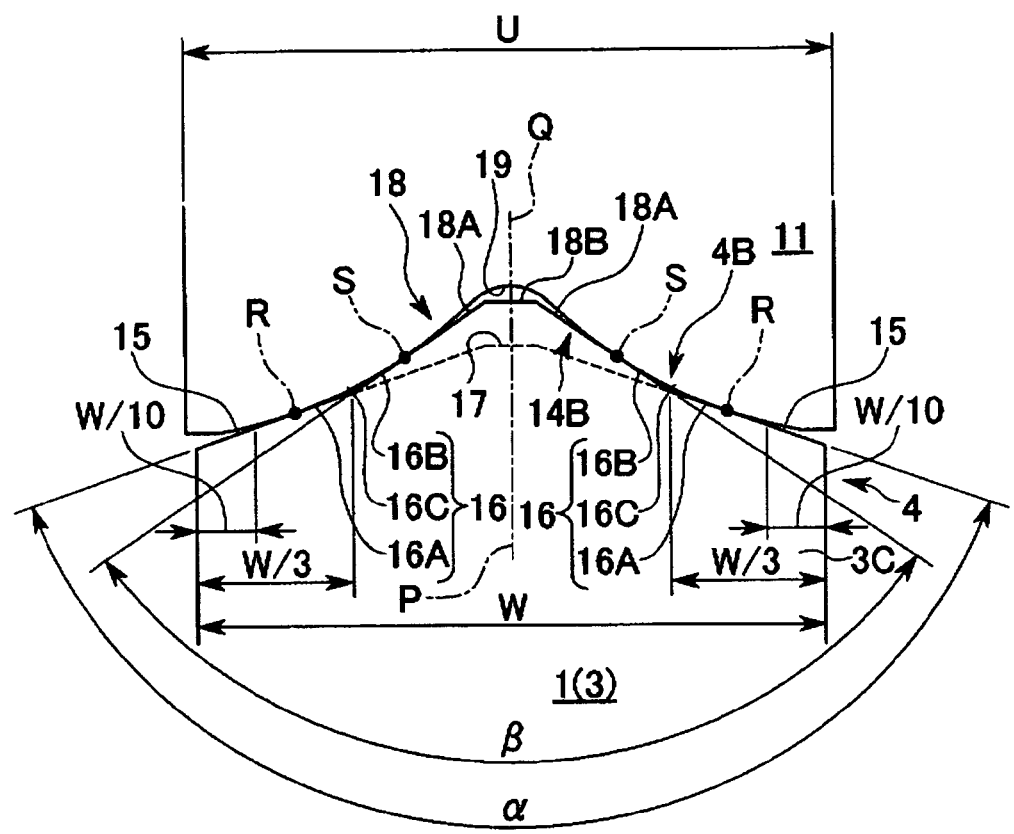
FIG. 11 is a cross-sectional view along a contacting direction (cross-sectional view taken along line ZZ of FIG. 10), which shows a state in which a lower contacting surface 4B of an insert mounting seat 4 and a lower contact surface 14B come in contact with each other.

Next, FIGS. 9 to 11 show an insert detachable tool to which a second embodiment of a clamping mechanism of the invention is applied. In the second embodiment, the same components as those in the first embodiment shown in FIGS. 1 to 8 are designated as the same reference numerals, and the description thereof will be omitted. In the clamping mechanism according to the present embodiment, one pair (contacting surfaces 4A and 4B in the present embodiment) of the contacting surfaces 4A and 4B and contact surfaces 14A and 14B, which is formed in a V-shape to be convex in the cross-section along the contacting direction, is provided with a guiding part 18. The guiding part 18 has the other pair of inclined planes 18A and 18A coming in contact with or facing the convex surfaces 16 and 16 provided to the other pair (contact surfaces 14A and 14B in the present embodiment) thereof, which is formed in a V-shape to be concave at positions between the pair of contacting positions R and R. The guiding part 18 may be provided to at least one of the one pair, which is formed in a V-shape to be, of the pair of contacting surfaces 4A and 4B and the pair of contact surfaces 14A and 14B. In the present embodiment, the guiding part 18 is provided to only one contacting surface 4B of the contacting surfaces 4A and 4B, which are formed in a V-shape to be concave.

That is, the guiding part 18 has a predetermined length at a longitudinal center of the contacting surface, and is provided on the contacting surface 4B formed in the lower jaw 3C of the head 3 at a central portion of the contacting surface 4B in the width direction so as to protrude from the inclined planes 15 and 15, and the flat plane 17. The guiding part 18 is composed of the other pair of inclined planes 18A and 18A, and a flat plane 18B. The other pair of inclined planes 18A and 18A is inclined to have an obtuse intersection angle β, which is smaller than the intersection angle α formed by the inclined planes 15 and 15, the flat plane 17 is formed on the projection in which the inclined planes 18A and 18A are intersected with each other. In addition, both of outside portions of the contacting surface 4B in the width direction at the longitudinal center to which the guiding part 18 is provided are formed so as to be notched by the extension surfaces of the inclined planes 18A and 18A. Accordingly, the contacting surface 4B is formed so that the central portion of the contacting surface 4B in the longitudinal direction is divided by the guiding part 18. Further, the inclined planes 15 and 15 of the contacting surface 4B, and the inclined planes 18A and 18A of the guiding part 18 are orthogonal to the longitudinal direction at longitudinal center. Accordingly, as shown in FIG. 11, the inclined planes 15 and 15 and the inclined planes 18A and 18A extend to be intersected in the obtuse angle.

Furthermore, the guiding part 18 is symmetric with respect to the plane P. As it goes to the both ends in the longitudinal ends, the cross-section is gradually reduced toward the contacting surface 4B. Accordingly, portion between the both ends has a constant cross-section. In addition, the both ends of the contacting surface 4B, of which longitudinal center is divided by the guiding part 18, have a constant cross-section so that the pair of inclined surfaces 15 and 15 and the flat plane 17 are positioned on the same plane in the longitudinal direction.

In the cutting insert 11 according to the present embodiment in which the guiding part 18 is mounted to the insert mounting seat 4 formed on the contacting surface 4B, since each of the convex surfaces 16 is composed of a first convex surface portion 16A and a second convex surface portion 16B, the contact surface 14B coming in contact with at least the contacting surface 4B of the pair of contact surfaces 14A and 14B is formed in a V-shape to be concave and rounded as a whole, and is gradually recessed toward the inner portion in the width direction. The first convex surface portion 16A has a cross-section formed in the shape of a circular arc at the outside in the width direction, and the second convex surface portion 16B has a cross-section formed in the shape of a circular arc which has a smaller radius than that of the first convex surface portion 16A at the inside in the width direction of the first convex surface portion 16A. In addition, a portion, in which the first and the second convex surface portion 16A and 16B are intersected, is connected by a third convex surface 16C. The third convex surface 16C is formed in the shape of a circular arc smoothly contacting with the circular arc, which is formed by the first and the second convex surface portion 16A and 16B in the cross-section. Furthermore, in the present embodiment, the contact surface 14A, which come in contact with the contacting surface 4A not provided with the guiding part 18, also has the same structure as described above.

In the present embodiment, as described above, when the contacting surface 4B and the contact surface 14B come in contact with each other so as to align the plane P passing through the widthwise center of the inert mounting seat 4 and the plane Q passing through the widthwise center of the cutting insert 11 with each other, the pair of inclined planes 15 and 15 and the pair of convex surfaces 16 and 16 come in contact with each other at a pair of contacting positions R and R, which are in the predetermined range, respectively. Furthermore, in the portion providing with the guiding part 18, the second convex surface portions 16B and 16B come in contact with the other pair of inclined planes 18A and 18A at a pair of contacting positions S and S that are between the contacting positions R and R in the width direction. Accordingly, in this state, as seen in the longitudinal direction, a tangent line of the first convex surface portion 16A at the contacting position R is aligned with the inclined plane 15 of the contacting surface 4B, and thus a tangent line of the second convex surface portion 16B at the contacting position S is aligned with the inclined plane 18A of the guiding part 18.

In the clamping mechanism according to the second embodiment having the above configuration, the cutting insert 11 is clamped, when the cutting insert 11 is clamped, the contact surface 14B comes in contact with the contacting surface 4B of the insert mounting seat 4 formed in the tip of the lower jaw 3C to mount the cutting insert 11 and then the cutting insert 11 is inserted into the insert mounting seat toward the rear end of the holder 1. In this case, on the guiding part 18 formed at the longitudinal center of the contacting surface 4B, while the second convex surface portions 16B and 16B of the convex surfaces 16 and 16 of the contact surface 14B come in contact with and slide on the other pair of the inclined planes 18A and 18A at the contacting positions S and S, the cutting insert 11 is smoothly guided. For this reason, the planes P and Q are exactly aligned with each other, and the first convex surface portions 16A and 16A of the contact surface 14B are guided so as to come in contact with the pair of inclined planes 15 and 15 which are formed on the longitudinal ends of the contacting surface 4B. Therefore, according to the present embodiment, since one contacting surface 4A of the upper jaw 3B comes in contact with the upper contact surface 14A of the cutting insert 11 by screwing the clamping screw 5, it is also possible to exactly position and clamp the cutting insert 11 in the insert mounting seat 4.

In addition, the guiding part 18 protrudes from the contacting surface 4B so that the other pair of inclined planes 18A and 18A is inclined to have an obtuse intersection angle P smaller than the intersection angle α formed by the inclined planes 15 and 15. The second convex surface portions 16B and 16B which are formed on the contact surface 14B of the cutting insert 11 at the inside in the width direction thereof come in contact with the inclined surfaces 18A and 18A at the contacting positions S and S. Accordingly, even if an excessive load is applied to the cutting insert 11 during the cutting, since the load is received by one of the inclined surfaces 18A and 18A, it is possible to more stably hold the cutting insert 11. Moreover, in the present embodiment, even though the intersection angle β is smaller than the intersection angle α, the intersection angle β is an obtuse angle. Therefore, even if there are shape errors in a radius of the second convex surface portions 16B and 16B in the cross-section, or the intersection angle β, the contacting positions S and S move nearly only in the width direction along the circular arc formed by the second convex surface portions 16B. For this reason, it is possible to accurately position the cutting insert 11 by controlling the contacting position S to be positioned to the predetermined position.

Furthermore, the guiding part 18 is provided to only the central portion in the longitudinal direction of the contacting surface 4B, and the longitudinal ends of the contacting surface 4B are formed in a V-shape to be convex by only the inclined planes 15 and 15. Meanwhile, the inclined plane 15 is notched at the central portion of the contacting surface, and then the inclined plane 18A of the guiding part 18 extends. Accordingly, since the contacting surface 4B may form the one kind of each of the inclined planes 15 and 18A in the longitudinal direction, easiness of the shaping thereof does not deteriorate. Correspondingly, the upper contact surface 14A of the cutting insert 11 is formed at the central portion other than the cutting edge portions 12 formed at the longitudinal ends, and the contacting surface 4A of the upper jaw 3A coming in contact with the contact surface 14A is provided immediately above the guiding part 18 or at the tip thereof. Accordingly, in the present embodiment, the cutting insert 11 is supported at the three points, which includes the contacting surface 4A and the contacting surface 4B of the lower longitudinal ends. As a result, the cutting insert is stably clamped into the insert mounting seat 4 in the contacting direction.

In addition, in this way, in the present embodiment, the convex surface 16 of the contact surface 14B of the cutting insert 11, which comes in contact with the inclined plane 15 of the contacting surface 4B and the inclined plane 18A of the guiding part 18, is formed by the first and the second convex surface portion 16A and 16B that are formed in the shape of a circular arc with different radius. However, for example, the convex surface 16 may be formed to have a cross-section formed in the shape of a convex line of which curvature radius is varied in a width direction, and Furthermore, the convex surface may be formed to have a cross-section formed in the shape of a convex line of which curvature radius is not varied as long as the convex surface can come in contact with the inclined planes 15 and 18A. Further, the upper contact surface 14A of the insert 11, which comes in contact with the contacting surface 4A of the upper jaw 3B not provided with the guiding part 18, may be formed by single convex surface portion 16A of which convex surface 16 can come in contact with the inclined surface 15 of the contacting surface 4A. Furthermore, in contrast to this, the cutting insert 11 may be guided by the pair of contacting surface 4A and 4B of the upper and the lower jaws 3B and 3C by also forming the guiding part 18 on the contacting surface 4A of the upper jaw 3B, or the guiding part 18 may be formed on only the upper jaw 3B.

In addition, in the present embodiment, the first and the second convex surface portion 16A and 16B of the convex surface 16 come in contact with the inclined planes 15 and 18A at each of the contacting positions R and S. However, the pair of inclined planes 18A and 18B of the guiding part 18 among these does not come in contact with the convex surface 16 during the clamping, and the pair of inclined planes 18A and 18B may be formed to face each other with a small interval therebetween at the position between the contacting positions R. In this case, if the interval is too large, even when the cutting insert 11 is not aligned or is inclined in the width direction during the insertion of the cutting insert 11, the cutting insert 11 is smoothly guided to be inserted so that the misalignment or inclination is corrected by the reason that the contact surface 14B formed in a V-shape to be concave comes in slide contact with the guiding part 18 of the contacting surface 4B. Then, the convex contacting surface 4B of the upper jaw 3B comes in contact with the concave contact surface 14B so that the cutting insert 11 is clamped. Accordingly, it is possible to exactly clamp the cutting insert 11 in the insert mounting seat 4 by aligning the planes P and Q with each other and positioning the contacting position R and R at predetermined position.

In the clamping mechanism having the above configuration, since one pair of the contacting surfaces and the contact surfaces is formed in a V-shape to be convex and has a pair of inclined planes, it is possible to form the contacting surfaces with ease and relatively high accuracy so that the inclined planes have a predetermined intersection angle. Then, since the other pair of the contacting surfaces and the contact surfaces is formed by the convex surfaces with roundness to be concave toward the inclined planes, respectively, the convex surface necessarily comes in contact with the inclined plane at one contacting position. Even if there are some errors in the intersection angle formed by the contacting surfaces in the V-shape so as to be concave, the intersection angle formed by the contact surfaces in the V-shape so as to be convex, or the curvature radius of the convex surfaces, the contacting positions deviate along the convex surfaces in the width direction. For this reason, the contacting surfaces can come in contact with the contact surfaces so that the variation of the contacting positions is small and the contacting positions are controlled to be positioned at predetermined positions.

In addition, since the pair of convex surfaces formed in a V-shape to be concave comes in contact with the pair of flat inclined planes formed in a V-shape to be convex, the cutting insert does not deviate due to the fact that the convex surfaces are guided by the inclined planes. Furthermore, microscopically, since the convex surfaces come in contact with the inclined planes in a state nearer to surface contact along contacting planes parallel to the inclined planes, it is possible to secure high mounting stability. Therefore, according to the clamping mechanism having the above configuration, the cutting insert can be clamped with stability, high accuracy, and high installation stiffness without high shape accuracy of the contacting surfaces and the contact surfaces, whereby it is possible to facilitate grooving or cutting-off with ease and high accuracy.

Furthermore, when the pair of inclined planes is inclined to have an intersection angle $\alpha$ in the range of 110° to 160° in the cross-section along the contacting direction, each of the curvature radiuses of the convex surfaces at the pair of contacting positions is in the range of 0.4 times to 4.0 times of the width dimension U to be not the smaller one between the width dimensions of the contacting surfaces and the contact surfaces in which the pair of inclined planes and the convex surfaces come in contact with each other at the pair contacting positions, or the combination of these is employed, it is possible to more reliably suppress the variation of the contacting positions caused by shape errors described above. That is, when the intersection angle formed by the pair of inclined planes is smaller than the range, or each of the curvature radiuses of the convex surfaces is larger than the range so that the convex surfaces are considered as a plane, if there are errors in the intersection angle or the curvature radiuses, there is a fear that the variation of the contacting positions becomes large. In addition, when the intersection angle is larger than the range so that a pair of inclined planes forms the shape of a nearly flat plane, if a load occurs in the width direction during the cutting, the stability deteriorates. Further, when each of the curvature radiuses is smaller than the range, the contacting surface comes in contact with the inclined plane in a state nearer to line contact, whereby there is a fear that it is not possible to secure the stability caused by the surface contact as described above.

Further, in the invention in which the pair of contacting positions between the pair of inclined planes and convex surfaces are controlled to be in the predetermined range as described above, the pair of contacting positions in the cross-section along the contacting direction is positioned in the range of one-tenth to one-third of the width dimensions W to be not the larger one between the width dimensions from both of the longitudinal ends thereof toward the inner portion thereof, of the contacting surfaces and the contact surfaces in which the pair of inclined planes and the convex surfaces come in contact with each other at the contacting positions. Accordingly, in the contacting surfaces and the contact surfaces, relatively outer portions of portions used for clamping can support the cutting insert, whereby it is possible to more stably clamp the cutting insert. That is, if the contacting positions are positioned in the inside of the range, when a large load is applied to the cutting insert during the cutting, there is a fear that the cutting insert is inclined. Meanwhile, when the contacting positions are positioned out of the range, the clamping force caused by the clamping screw is concentrated on each of outer portions, which have small dimensions in the width direction, whereby there is a fear that deficits or transformations occur in each of the outer portions.

Furthermore, one pair of the contacting surfaces and contact surfaces, which is formed in a V-shape to be convex in the cross-section along the contacting direction, is provided with a guiding part having the other pair of inclined planes coming in contact with or facing the convex surfaces provided to the other pair thereof, which is formed in a V-shape to be concave at positions between the pair of contacting positions. Accordingly, the guiding part protrudes from the central portion formed in a V-shaped to be convex in the width direction, that is, the V-shape projection, and is engaged with or is received in the central portion formed in a V-shaped to be concave in the width direction, that is, the V-shape recess. For this reason, the pair of convex surfaces formed in a V-shape to be concave comes in slide contact with the other pair of inclined planes of the guiding part to be guided at the time when the cutting insert is inserted into the insert mounting seat in the direction orthogonal to the cross-section, or the convex surfaces facing the one side comes in contact with the other pair of inclined planes of the guiding part to be guided at the time when the convex surfaces are not aligned or is inclined toward one side in the width direction. Therefore, it is possible to insert and mount the cutting insert into the insert mounting seat so that the pair of contacting positions is reliably positioned at predetermined positions in the predetermined range.

What is claimed is:

1. A clamping mechanism for clamping a cutting insert, comprising:
   a holder having first and second contacting surfaces which face each other, the first and second contacting surfaces having inclined planes to form a convex V-shape;
   an insert mounting seat for receiving the cutting insert, the insert mounting seat being formed at a tip of the holder; and
   the cutting insert comprising:
      a first contact surface forming at least a portion of the upper surface of the cutting insert, and a second contact surface forming at least a portion of the bottom surface of the cutting insert, which respectively contact the first and second contacting surfaces of the holder, the first and second contact surfaces each having cross-sectional convex surfaces comprising a left lateral face and a right lateral face; and
      a first concave recess at the junction of the left lateral face and right lateral face of the first contact surface, and a second concave recess at the junction of the left lateral face and right lateral face of the second contact surface, wherein the inclined planes and the convex surfaces contact each other at a first set of respective contacting positions.

2. The clamping mechanism for a cutting insert according to claim 1,
wherein the inclined planes are inclined to have an intersection angle α in the range of 110° to 160° in the cross-section along the contacting direction.

3. The clamping mechanism for a cutting insert according to claim 1,
wherein the curvature radius of each of the convex surfaces of the cutting insert is in the range of 0.4 times to 4.0 times the width U, where U is the width of the cutting insert as measured in the cross-section along the contacting direction.

4. The clamping mechanism for a cutting insert according to claim 1,
wherein each of the first respective contacting positions is positioned in the range of one-tenth to one-third of the width W as measured from a respective longitudinal end of the insert mounting seat towards a center of the insert mounting seat, where W is the width of the insert mounting seat as measured in the cross-section along the contacting direction.

5. The clamping mechanism for a cuffing insert according to claim 1, further comprising:
a guiding part having left and right surfaces, the left and right surfaces having inclined planes in a convex V-shape which contact the first and second contact surfaces of the cutting insert at a second set of respective contacting positions.

6. A clamping mechanism for clamping a cutting insert, comprising:
a holder comprising:
first and second contacting surfaces which face each other, the first and second contacting surfaces each having a cross-sectional convex surface comprising a left lateral face and a right lateral face;
a first concave recess at the junction of the left lateral face and right lateral face of the first and contacting surface; and
a second concave recess at the junction of the left lateral face and right lateral face of the second contacting surface;
an insert mounting seat for receiving the cutting insert, the insert mounting seat being formed at a tip of the holder; and
the cutting insert comprising a first contact surface forming at least a portion of the upper surface of the cutting insert, and a second contact surface forming at least a portion of the bottom surface of the cuffing insert, which respectively contact the first and second contacting surfaces of the holder, the first and second contact surfaces having inclined planes to form a convex V-shape,
wherein the inclined planes and the convex surfaces contact each other at respective contacting positions.

7. The clamping mechanism for a cutting insert according to claim 6,
wherein the inclined planes are inclined to have an intersection angle α in the range of 110° to 160° in the cross-section along the contacting direction.

8. The clamping mechanism for a cuffing insert according to claim 6,
wherein the curvature radius of each of the convex surfaces of the holder is in the range of 0.4 times to 4.0 times the width U, where U is the width of the holder as measured in the cross-section along the contacting direct.

9. The clamping mechanism for a cutting insert according to claim 6,
wherein each of the respective contacting positions is positioned in the range of one-tenth to one-third of the width W as measured from a respective longitudinal end of the cutting insert towards a center of the cutting insert, where W is the width of the cutting insert as measured in the cross-section along the contacting direction.

10. The clamping mechanism for a cutting insert according to claim 6, further comprising:
a guiding part having left and right surfaces, the left and right surfaces having inclined planes in a convex V-shape which contact the first and second contacting surfaces of the insert mounting seat at a second set of respective contacting positions.

11. A clamping mechanism for clamping a cutting insert, comprising:
a holder having first and second contacting surfaces which face each other;
an insert mounting seat for receiving the cutting insert, the insert mounting seat being formed at a tip of the holder; and
a guiding part having left and right surfaces in the form of inclined planes in a convex V-shape to guide the cutting insert, and
the cutting insert having a first contact surface forming at least a portion of the upper surface of the cutting insert, and a second contact surface forming at least a portion of the bottom surface of the cutting insert, which respectively contact the first and second contacting surfaces of the holder at a first set of respective contacting positions,
wherein the guiding part is positioned between the first set of respective contacting positions, as viewed from a cross-section of the insert mounting seat.

12. The clamping mechanism for clamping a cutting insert according to claim 11, wherein
the holder further comprises first and second contacting surfaces having inclined planes forming a convex V-shape;
the cutting insert further comprises:
first and second contact surfaces, each contact surface having cross-sectional convex surface comprising a left lateral face and a right lateral face; and
a first concave recess at the junction of the left lateral face and right lateral face of the first contact surface, and a second concave recess at the junction of the left lateral face and right lateral face of the second contact surface,
wherein the inclined planes of the guiding part respectively contact the first and second contact surfaces of the cutting insert at a second set of respective contacting positions located between the first set of respective contacting positions.

13. The clamping mechanism for clamping a cutting insert according to claim 11, wherein
the holder further comprises:
first and second contacting surfaces, each contacting surface having cross-sectional convex a surface forming a convex V-shape comprising a left lateral face and a right lateral face; and a first concave recess at the junction of the left lateral face and right lateral face of the first contact surface, and a second concave recess at the junction of the left lateral face and right lateral face of the second contact surface;

the cutting insert further comprises first and second contact surfaces having inclined planes forming a convex V-shape, wherein the inclined planes of the guiding part respectively contact the first and second contacting surfaces of the holder at a second set of respective contacting positions located between the first set of respective contacting positions.

14. The clamping mechanism for clamping a cutting insert according to claim 12, wherein the inclined planes of the contacting surfaces are inclined to have an intersection angle α in the range of 110° to 160° in the cross-section along the contacting direction.

15. The clamping mechanism for clamping a cutting insert according to claim 13, wherein the inclined planes of the contact surfaces are inclined to have an intersection angle α in the range of 110° to 160° in the cross-section along the contacting direction.

16. The clamping mechanism for clamping a cutting insert according to claim 14, wherein the inclined planes of the guiding part are inclined to have an intersection angle β, which an obtuse angle that is smaller than the intersection angle α in the cross-section along the contacting direction.

17. The clamping mechanism for clamping a cutting insert according to claim 15, wherein the inclined planes of the guiding part are inclined to have an intersection angle β, which an obtuse angle that is smaller than the intersection angle α in the cross-section along the contacting direction.

18. The clamping mechanism for clamping a cutting insert according to claim 5, wherein the left and right surfaces of the guiding part are in contact with or facing each other.

19. The clamping mechanism for clamping a cutting insert according to claim 10, wherein the left and right surfaces of the guiding part are in contact with or facing each other.

20. The clamping mechanism for clamping a cutting insert according to claim 11, wherein the left and right surfaces of the guiding part are in contact with or facing each other.

21. A clamping mechanism for clamping a cutting insert, comprising:
    a holder having first and second contacting surfaces which face each other;
    an insert mounting seat for receiving the cutting insert, the insert mounting seat being formed at a tip of the holder;
    the cutting insert further comprising:
        a first contact surface forming at least a portion of the upper surface of the cutting insert; and
        a second contact surface forming at least a portion of the bottom surface of the cutting insert,
        wherein the first contact surface and the second contact surface respectively contact the first and second contacting surfaces of the holder at a first set of respective contacting positions,
        wherein a guiding part is mounted to the cutting insert, the guiding part having left and right surfaces in the form of inclined planes in a convex V-shape to guide the cutting insert, the guiding part positioned between the first set of respective contacting positions, as viewed from a cross-section of the insert mounting seat.

22. The clamping mechanism for clamping a cutting insert according to claim 21, wherein the holder further comprises first and second contacting surfaces having inclined planes forming a convex V-shape; and
    the cutting insert further comprises:
        first and second contact surfaces, each contact surface having a cross-sectional convex surface comprising a left lateral face and a right lateral face; and
        a first concave recess at the junction of the left lateral face and right lateral face of the first contact surface, and a second concave recess at the junction of the left lateral face and right lateral face of the second contact surface,
        wherein the inclined planes of the guiding part respectively contact the first and second contact surfaces of the cutting insert at a second set of respective contacting positions located between the first set of respective contacting positions.

23. The clamping mechanism for clamping a cutting insert according to claim 21, wherein the holder further comprises:
    first and second contacting surfaces, each contacting surface having cross-sectional convex a surface forming a convex V-shape comprising a left lateral face and a right lateral face; and
    a first concave recess at the junction of the left lateral face and right lateral face of the first contact surface, and a second concave recess at the junction of the left lateral face and right lateral face of the second contact surface;
    the cutting insert further comprises first and second contact surfaces having inclined planes forming a convex V-shape,
    wherein the inclined planes of the guiding part respectively contact the first and second contacting surfaces of the holder at a second set of respective contacting positions located between the first set of respective contacting positions.

24. The clamping mechanism for clamping a cutting insert according to claim 22, wherein the inclined planes of the contacting surfaces are inclined to have an intersection angle α in the range of 110° to 160° in the cross-section along the contacting direction.

25. The clamping mechanism for clamping a cutting insert according to claim 23, wherein the inclined planes of the contact surfaces are inclined to have an intersection angle α in the range of 110° to 160° in the cross-section along the contacting direction.

26. The clamping mechanism for clamping a cutting insert according to claim 24, wherein the inclined planes of the guiding part are inclined to have an intersection angle β, which an obtuse angle that is smaller than the intersection angle α in the cross-section along the contacting direction.

27. The clamping mechanism for clamping a cutting insert according to claim 25, wherein the inclined planes of the guiding part are inclined to have an intersection angle β, which an obtuse angle that is smaller than the intersection angle α in the cross-section along the contacting direction.

28. The clamping mechanism for clamping a cutting insert according to claim 21, wherein the left and right surfaces of the guiding part are in contact with or facing each other.

29. The clamping mechanism for a cutting insert according to claim 1, wherein the cutting insert further comprises:
    a guiding part having left and right surfaces, the left and right surfaces having inclined planes in a convex V-shape which contact the first and second contact surfaces of the cutting insert at a second set of respective contacting positions.

30. The clamping mechanism for a cutting insert according to claim 6, wherein the cutting insert further comprises:
a guiding part having left and right surfaces, the left and right surfaces having inclined planes in a convex V-shape which contact the first and second contacting surfaces of the insert mounting seat at a second set of respective contacting positions.

* * * * *